United States Patent
Cheng et al.

(10) Patent No.: US 9,973,748 B1
(45) Date of Patent: May 15, 2018

(54) MULTI-CORE VIDEO DECODER SYSTEM FOR DECODING MULTIPLE CODING ROWS BY USING MULTIPLE VIDEO DECODER CORES AND RELATED MULTI-CORE VIDEO DECODING METHOD

(71) Applicant: MEDIATEK INC., Hsin-Chu (TW)

(72) Inventors: Chia-Yun Cheng, Hsinchu County (TW); Yung-Chang Chang, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 386 days.

(21) Appl. No.: 14/259,144

(22) Filed: Apr. 22, 2014

Related U.S. Application Data

(60) Provisional application No. 61/816,272, filed on Apr. 26, 2013, provisional application No. 61/860,696, filed on Jul. 31, 2013.

(51) Int. Cl.
| | |
|---|---|
| *H04N 19/00* | (2014.01) |
| *H04N 19/136* | (2014.01) |
| *H04N 19/127* | (2014.01) |
| *H04N 19/119* | (2014.01) |
| *H04N 19/176* | (2014.01) |
| *H04N 19/196* | (2014.01) |

(52) U.S. Cl.
CPC . *H04N 19/00139* (2013.01); *H04N 19/00072* (2013.01); *H04N 19/00103* (2013.01); *H04N 19/00278* (2013.01); *H04N 19/00369* (2013.01)

(58) Field of Classification Search
CPC .............................. H04N 19/44; H04N 19/70
USPC ...................................................... 375/240.02
See application file for complete search history.

(56) References Cited

U.S. PATENT DOCUMENTS

| | | | | |
|---|---|---|---|---|
| 2002/0009287 A1* | 1/2002 | Ueda | ...................... | H04N 5/783 386/283 |
| 2003/0021346 A1* | 1/2003 | Bixby | .............. | H04N 21/44016 375/240.25 |
| 2003/0189982 A1* | 10/2003 | MacInnis | ............. | H04N 19/176 375/240.24 |
| 2004/0240547 A1* | 12/2004 | Ogura | .................. | H04N 19/895 375/240.12 |
| 2008/0022182 A1* | 1/2008 | Katayama | ......... | H03M 13/1515 714/752 |
| 2013/0202051 A1* | 8/2013 | Zhou | .................... | H04N 19/436 375/240.26 |
| 2013/0322550 A1* | 12/2013 | Symes | ................... | H04N 19/44 375/240.26 |
| 2015/0023409 A1* | 1/2015 | Schierl | ................... | H04N 19/70 375/240.02 |

* cited by examiner

*Primary Examiner* — Jeffery Williams
(74) *Attorney, Agent, or Firm* — Winston Hsu

(57) ABSTRACT

A multi-core video decoder system has a syntax parser, a storage device, a plurality of video decoder cores and a control unit. The syntax parser performs syntax parsing upon an incoming encoded video bitstream to derive required information of each picture to be decoded. The storage device buffers the required information of each picture. The control unit controls the video decoder cores to load required information of a plurality of coding rows in a picture from the storage device and then decode the coding rows in the picture, respectively.

26 Claims, 11 Drawing Sheets

(A)

(B)

MULTI-CORE VIDEO DECODER SYSTEM FOR DECODING MULTIPLE CODING ROWS BY USING MULTIPLE VIDEO DECODER CORES AND RELATED MULTI-CORE VIDEO DECODING METHOD

CROSS REFERENCE TO RELATED APPLICATIONS

This application claims the benefit of U.S. provisional application No. 61/816,272 (filed on Apr. 26, 2013) and U.S. provisional application No. 61/860,696 (filed on Jul. 31, 2013). The entire contents of these related applications are incorporated herein by reference.

BACKGROUND

The disclosed embodiments of the present invention relate to video decoding, and more particularly, to a multi-core video decoder system for decoding multiple coding rows by using multiple video decoder cores and related multi-core video decoding method.

Video coding technologies have been widely used in a variety of applications, including digital video streaming, digital video storage, digital television broadcasting, etc. If no video coding is used, the data amount of the video would be very large. For example, considering a video clip having 720×480 pixels per frame, 30 frames per second and a playback time of 90 minutes, the data amount of this video clip is about 167.96 G bytes. The video coding technique achieves data compression by exploiting spatial and temporal redundancy in the video contents. Hence, a video encoder is designed to efficiently reduce spatial and temporal redundancy to achieve the video compression.

When receiving an encoded video bitstream, a video decoder is operative to reconstruct frames of the video by decoding the encoded video bitstream. In general, the conventional video decoder employs one video decoder core to reconstruct frames of a standard definition (SD) video or a high definition (HD) video. However, regarding a ultra high definition (UHD) video, it is composed of frames each having a resolution higher than that of the SD/HD frame. For example, the UHD frame may have a resolution of 3840×2160. The data amount of one UHD frame is larger than that of one SD/HD frame, and may exceed the decoding capability of the conventional single-core video decoder. If the conventional single-core video decoder fails to reconstruct one UHD frame in time, the display quality of the UHD video would be degraded.

SUMMARY

In accordance with exemplary embodiments of the present invention, a multi-core video decoder system for decoding multiple coding rows by using multiple video decoder cores and related multi-core video decoding method are proposed to solve the above-mentioned problem.

According to a first aspect of the present invention, an exemplary multi-core video decoder system is disclosed. The exemplary multi-core video decoder system includes a syntax parser, a storage device, a plurality of video decoder cores and a control unit. The syntax parser is arranged to perform syntax parsing upon an incoming encoded video bitstream to derive required information of each picture to be decoded. The storage device is arranged to buffer the required information of each picture. The control unit is arranged to control the video decoder cores to load required information of a plurality of coding rows in a picture from the storage device and then decode the coding rows in the picture, respectively.

According to a second aspect of the present invention, an exemplary multi-core video decoding method is disclosed. The exemplary multi-core video decoding method includes: performing syntax parsing upon an incoming encoded video bitstream to derive required information of each picture to be decoded; storing the required information of each picture into a storage device; and controlling a plurality of video decoder cores to load required information of a plurality of coding rows in a picture from the storage device and then decode the coding rows in the picture, respectively.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The main concept of the present invention is to use multiple video decoder cores to decode multiple coding rows in a picture, respectively. Preferably, multiple coding rows in a UHD picture are decoded in a parallel manner, thus meeting the strict decoding requirement of a UHD video. Further details of the proposed multi-core video decoding structure are described hereinafter with reference to accompanying drawings.

Figure 1:
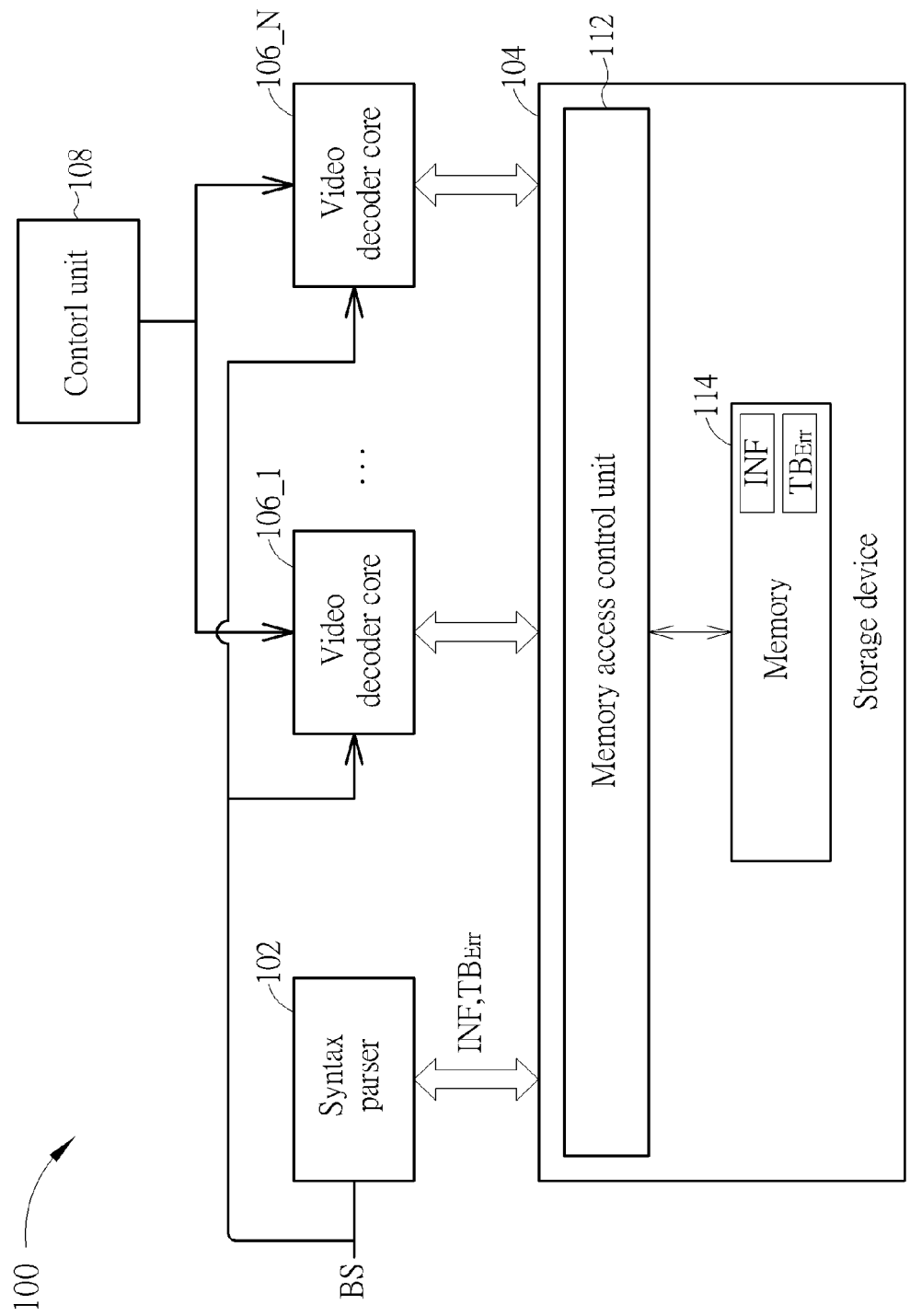
FIG. 1 is a block diagram illustrating a multi-core video decoder system according to an embodiment of the present invention.

FIG. 1 is a block diagram illustrating a multi-core video decoder system according to an embodiment of the present invention. The multi-core video decoder system 100 may be employed by any application requiring a video playback function, especially a UHD video playback function. The multi-core video decoder system 100 includes a syntax parser 102, a storage device 104, a plurality of video decoder cores 106_1-106_N (N≥2), and a control unit 108. The syntax parser 102 is arranged to perform syntax parsing upon an incoming encoded video bitstream BS (e.g., an encoded bitstream of a UHD video) to derive required information INF of each picture to be decoded. The encoded video bitstream BS may be an output of a video encoder at a video source end, and received by an electronic device (e.g., a mobile phone) employing the proposed multi-core video decoder system 100 through any transmission means. Each picture to be decoded includes a plurality of coding rows, and each coding row is composed of a plurality of encoded data units. For example, multiple coding rows would form one picture if the picture is not partitioned into a plurality of tiles; and multiple coding rows would form one tile if the picture is partitioned into a plurality of tiles. Based on the coding standard employed, the coding row and the encoded data unit may have specific definitions. For example, when the encoded video bitstream BS is generated based on a coding standard such as MPEG4, H.264, etc., the encoded data unit is one macroblock (MB), and the coding row may include one or more MB rows, depending upon actual design consideration. When the encoded video bitstream BS is generated based on another coding standard such as HEVC (High Efficiency Video Coding), the encoded data unit is one coding tree unit (CTU) (also known as a largest coding unit (LCU)), and the coding row may include one or more CTU rows, depending upon actual design consideration. For clarity and simplicity, the following assumes that each coding row is composed of one CTU/MB row only. However, this is not meant to be a limitation of the present invention.

There is dependency between vertically adjacent coding rows (e.g., MB/CTU rows). For example, decoding of a current coding row requires information given from a decoding result of a previous coding row above the current coding row. The conventional decoder design therefore decodes vertically adjacent coding rows one by one. As a result, no parallel decoding of coding rows is feasible in the conventional decoder design. In this embodiment, the syntax parser 102 is particularly designed to facilitate the parallel decoding of coding rows. Specifically, the syntax parser 102 is responsible for parsing the syntax of the encoded video bitstream BS, extracting required information needed to start decoding each coding row, and storing the extracted information of each coding row into the storage device 104. In other words, the required information INF of each picture would include required information needed to start decoding each coding row (which may be part of a tile in the picture if the picture has tiles or may be part of the picture if the picture has no tile). Please note that a designated start point of a decoding operation of each coding row may be at a predetermined position within the coding row, such as the beginning of the coding row or a midway position of the coding row. For clarity and simplicity, the following assumes that the designated start point of the decoding operation of each coding row is at the beginning of the coding row. However, this is not meant to be a limitation of the present invention.

Regarding each coding row, the syntax parser 102 only stores a status at a designated start position of a decoding operation of the coding row (e.g., beginning of the coding row) that one of the video decoder cores 106_1-106_N uses to start decoding the coding row into the storage device 104 to serve as the required information of the coding row. For example, the status may include a bitstream offset (which indicates the location of the current parsed bit/byte in the encoded video bitstream BS), CABAC (context-adaptive binary arithmetic coding) context variables, neighbor information, slice header information, etc. To put it simply, the required information of each coding row includes pre-parsed syntax information that is needed to start the decoding of a current coding row earlier than the end of the decoding of a previous coding row above the current coding row. In this way, parallel decoding of multiple coding rows is achieved with the help of the syntax parser 102.

The storage device 104 is arranged to buffer the required information INF of each picture generated from the syntax parser 102. In this embodiment, the storage device 104 includes a memory access control unit 112 and a memory 114. The memory access control unit 112 serves as an interface to serve read requests and write requests for accessing the memory 114. However, this is for illustrative purposes only, and is not meant to be a limitation of the present invention. That is, the storage device 104 any be implemented using other storage technology.

In this embodiment, more than one full-function video decoder core is available in the proposed multi-core video decoder system 100. More specifically, when the proposed multi-core video decoder system 100 is a dual-core system, the number of video decoder cores 106_1-106_N is equal to two (i.e., N=2); and when the proposed multi-core video decoder system 100 is a quad-core system, the number of video decoder cores 106_1-106_N is equal to four (i.e., N=4). The term "full-function video decoder core" means that the video decoder core may act as a standalone decoder configured to perform a complete decoding procedure specified by the video coding standard. In this embodiment, even though the syntax parser 102 performs a pre-parsing operation to obtain required information of each coding row (e.g., the status at beginning of each coding row), each of the video decoder cores 106_1-106_N still performs syntax parsing upon the whole coding row so as to obtain a status for each encoded data unit in the coding row.

Figure 2:
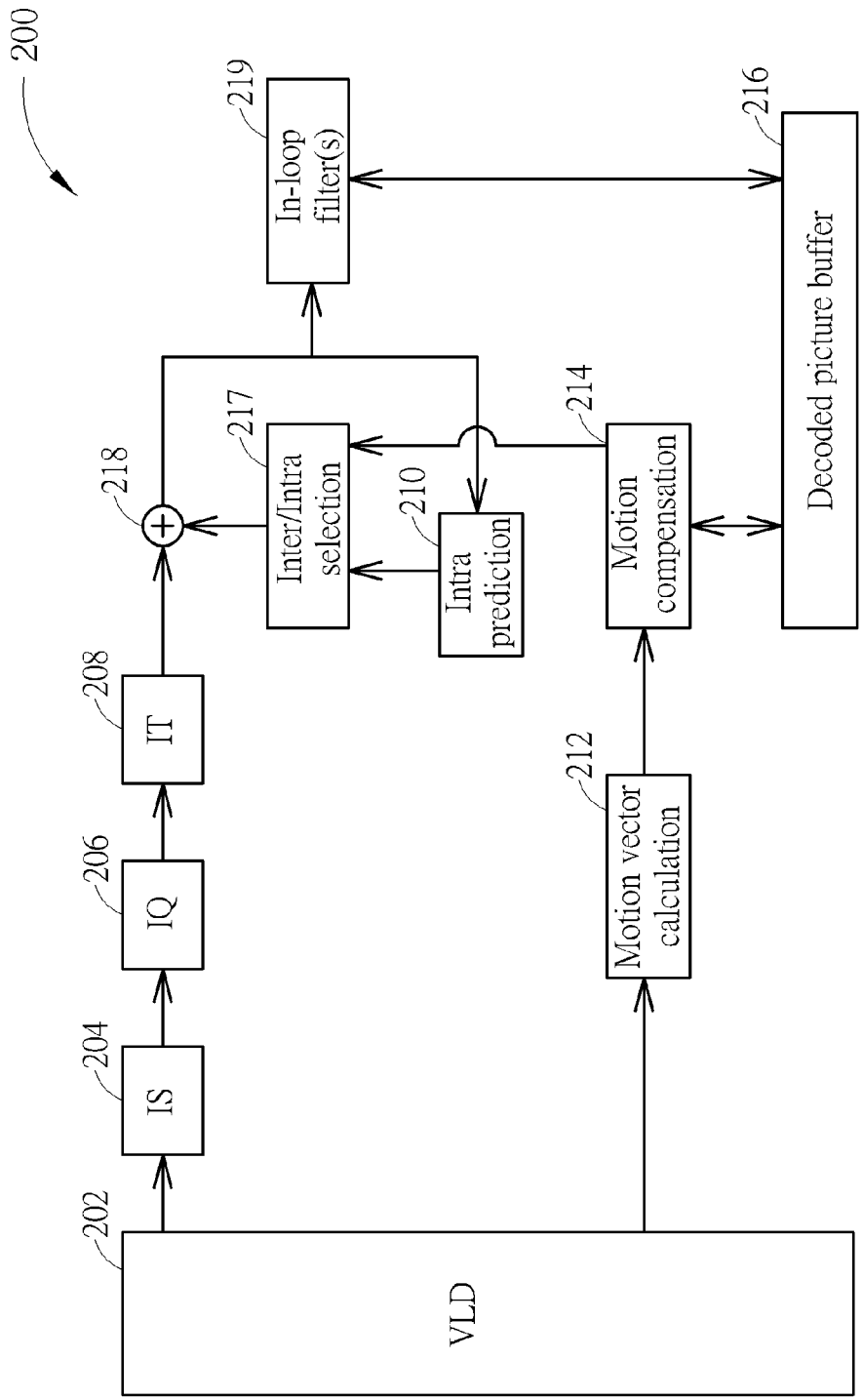
FIG. 2 is a block diagram illustrating a video decoder core used in the multi-core video decoder system shown in FIG. 1.

Please refer to FIG. 2, which is a block diagram illustrating a video decoder core used in the multi-core video decoder system 100 shown in FIG. 1. Each of the video decoder cores 106_1-106_N may be implemented using the exemplary video decoder core 200 shown in FIG. 2. The video decoder core 200 has all of the functional blocks of a typical video decoder. The functional blocks may include a variable length decoder (VLD) 202 used to do syntax parsing, an inverse scan (IS) block 204, an inverse quantization (IQ) block 206, an inverse transform (IT) block 208, an intra prediction block 210, a motion vector (MV) calculation block 212, a motion compensation block 214, a decoded picture buffer 216, an intra/inter selection block 217, an adder 218, and at least one in-loop filter 219 such as a deblocking filter and/or a sample adaptive offset (SAO) filter. As a person skilled in the pertinent art can readily understand details of each functional block shown in FIG. 2, further description is omitted here for the sake of brevity.

The video decoder structure shown in FIG. 2 is for illustrative purposes only, and is not meant to be a limitation of the present invention. That is, when a different video coding standard is employed, each of the video decoder cores 106_1-106_N may be implemented using a different video decoder structure complying with the employed video coding standard.

The control unit 108 is coupled to the video decoder cores 106_1-106_N, and arranged to control the video decoder cores 106_1-106_N to load required information of a plurality of coding rows in a picture from the storage device 104 and then decode the coding rows in the picture, respectively. As shown in sub-diagram (A) of FIG. 3, the coding rows respectively processed by the video decoder cores 106_1-106_N may be coding rows included in tile(s) of a picture (e.g., CTU/MB row 0-CTU/MB row I in tile 0 of picture IMG) if the picture is encoded based a plurality of tiles. As shown in sub-diagram (B) of FIG. 3, the coding rows respectively processed by the video decoder cores 106_1-106_N may be part of coding rows included in a picture (e.g., CTU/MB row 0-CTU/MB row I in picture IMG) if the picture is encoded without being partitioned into a plurality of tiles.

Figure 3:
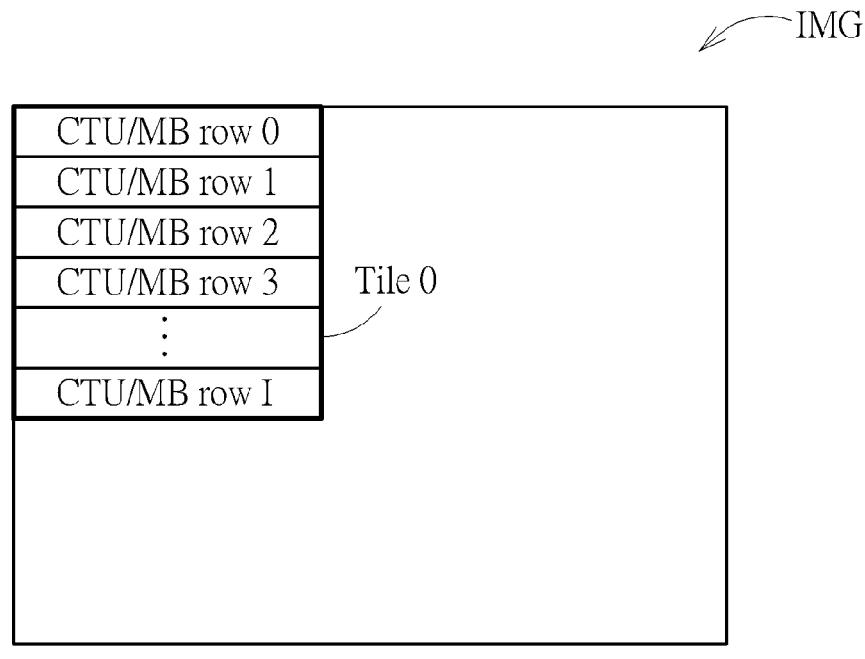
FIG. 3 is a diagram illustrating different arrangements of coding rows in a picture according to an embodiment of the present invention.
Figure 3:
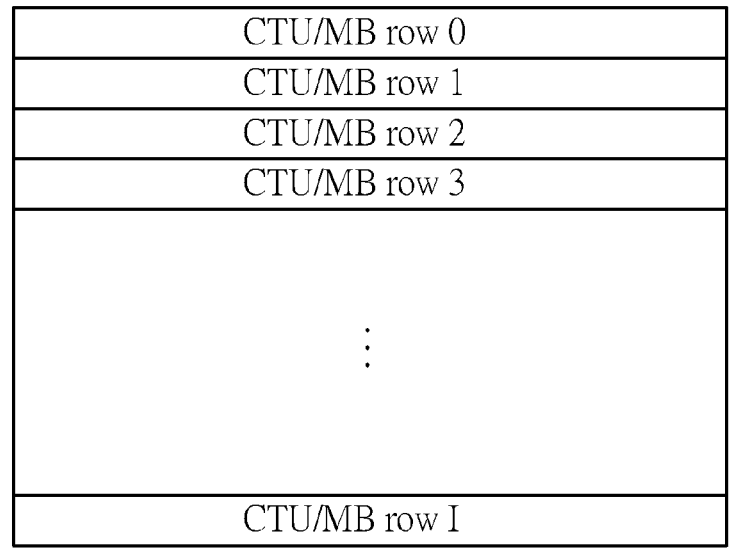
Figure 4:
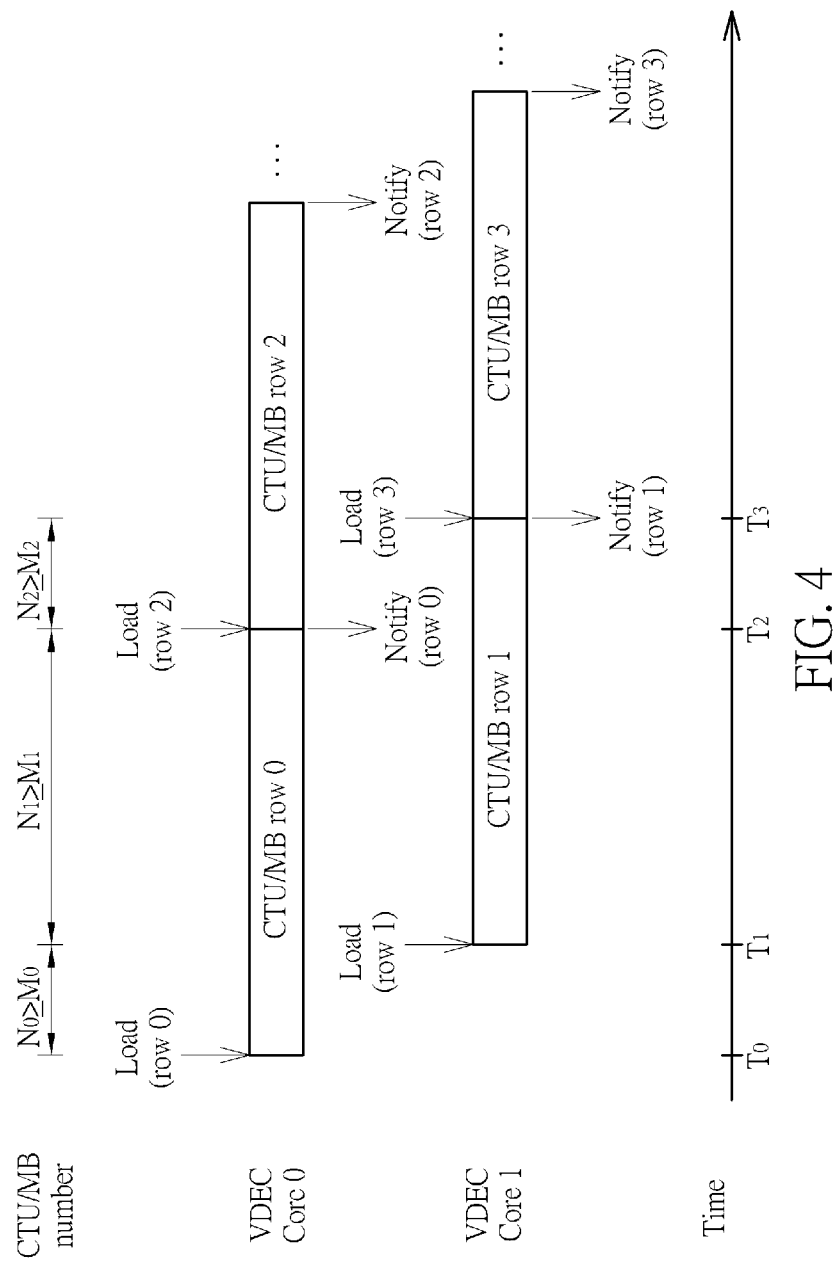
FIG. 4 is a timing diagram illustrating a parallel decoding operation of multiple coding rows according to an embodiment of the present invention.

Please refer to FIG. 4 in conjunction with FIG. 3. FIG. 4 is a timing diagram illustrating a parallel decoding operation of multiple coding rows according to an embodiment of the present invention. For clarity and simplicity, it is assumed that the multi-core video decoder system 100 is a dual-core video decoder system having two video decoder cores VDEC Core 0 and VDEC Core 1. In this example, the video decoder cores 106_1-106_N only have video decoder cores VDEC Core 0 and VDEC Core 1 due to N=2. The dual-core video decoder system is used to decode CTU/MB row 0-CTU/MB row I, as shown in FIG. 3. At time $T_0$, the control unit 108 controls the video decoder core VDEC Core 0 to load the required information of CTU/MB row 0 (e.g., status at the beginning of CTU/MB row 0), and then triggers the video decoder core VDEC Core 0 to start decoding CTU/MB row 0. It should be noted that decoding of one CTU/MB at a current CTU/MB row needs to refer to reconstructed CTU(s)/MB(s) located at a different CTU/MB row above the current CTU/MB row. Hence, decoding of CTU/MB row 0 and decoding of CTU/MB row 1 do not start at the same time. Specifically, even though required information of CTU/MB row 1 (e.g., status at the beginning of CTU/MB row 1) is already available in the storage device 104, the decoding of $1^{st}$ CTU/MB of CTU/MB row 1 cannot be performed at the absence of reconstructed CTU(s)/MB(s) of CTU/MB row 0. For example, the intra prediction performed upon the $1^{st}$ CTU/MB of CTU/MB row 1 needs to check reconstructed CTU (s)/MB (s) of CTU/MB row 0. To put it simply, since decoding of one CTU/MB at a current CTU/MB row needs to refer to reconstructed CTU(s)/MB(s) located at a different CTU/MB row above the current CTU/MB row, decoding of $1^{st}$ CTU/MB of CTU/MB row 1 (i.e., decoding of CTU/MB row 1) is not started until reconstructed CTU(s)/MB(s) of CTU/MB row 0 required by the decoding of $1^{st}$ CTU/MB of CTU/MB row 1 are already available.

In this embodiment, the control unit 108 does not trigger a second video decoder core of the video decoder cores 106_1-106_N to start decoding a second coding row below a first coding row until a first video decoder core of the video decoder cores 106_1-106_N finishes decoding an $M^{th}$ encoded data unit in the first coding row, where M is a positive integer, and the first coding row and the second coding row of the coding rows are vertically adjacent to each other. The M value may be programmable or set by a fixed value. Besides, different coding rows may have different M values or the same M value, depending upon the actual design consideration. In the example shown in FIG. 4, the M values associated with CTU/MB row 0, CTU/MB row 1 and CTU/MB row 2 are set by $M_0$, $M_1$, $M_2$, respectively. Therefore, decoding of CTU/MB row 1 is allowed to be started after decoding of the $M_0^{th}$ CTU/MB of CTU/MB row 0 is finished (i.e., the reconstructed $M_0^{th}$ CTU/MB of CTU/MB row 0 is obtained); decoding of CTU/MB row 2 is allowed to be started after decoding of the $M_1^{th}$ CTU/MB of CTU/MB row 1 is finished (i.e., the reconstructed $M_1^{th}$ CTU/MB of CTU/MB row 1 is obtained); and decoding of CTU/MB row 3 is allowed to be started after decoding of the $M_2^{th}$ CTU/MB of CTU/MB row 2 is finished (i.e., the reconstructed $M_2^{th}$ CTU/MB of CTU/MB row 2 is obtained). At time $T_1$, the video decoder core VDEC Core 0 finishes decoding $N_0$ CTUs/MBs (i.e., $1^{st}$ CTU/MB to $N_0^{th}$ CTU/MB) of CTU/MB row 0, where $N_0 \geq M_0$. Since decoding of the $M_0^{th}$ CTU/MB of CTU/MB row 0 is already done, the control unit 108 controls the video decoder core VDEC Core 1 to load the required information of CTU/MB row 1 (e.g., status at the beginning of CTU/MB row 1), and then triggers the video decoder core VDEC Core 1 to start decoding CTU/MB row 1.

The video decoder cores 106_1-106_N are capable of decoding a plurality of coding rows in a parallel manner. Specifically, a processing time of at least one of the video decoder cores 106_1-106_N decoding at least one of the coding rows is overlapped with a processing time of at least another one of the video decoder cores 106_1-106_N decoding at least another one of the coding rows. In this example shown in FIG. 4, the video decoder core VDEC Core 0 and the video decoder core VDEC Core 1 are both active at time $T_1$, thus achieving the parallel decoding of two coding rows (i.e., CTU/MB row 0 and CTU/MB row 1).

At time $T_2$, the video decoder core VDEC Core 0 finishes decoding the last CTU/MB of CTU/MB row 0 (i.e., the decoding of CTU/MB row 0 is done), and generates a notification to the control unit 108. At this moment, the video decoder core VDEC Core 1 finishes decoding $N_1$ CTUs/MBs (i.e., $1^{st}$ CTU/MB to $N_1^{th}$ CTU/MB) of CTU/MB row 1, where $N_1 \geq M_1$. Since decoding of the $M_1^{th}$ CTU/MB of CTU/MB row 0 is already finished and the video decoder core VDEC Core 0 is idle, the control unit 108 controls the video decoder core VDEC Core 0 to load the required information of CTU/MB row 2 (e.g., status at the beginning of CTU/MB row 2), and then triggers the video decoder core VDEC Core 0 to start decoding CTU/MB row 2. In this example shown in FIG. 4, the video decoder core VDEC Core 0 and the video decoder core VDEC Core 1 are both active at time $T_2$, thus achieving the parallel decoding of two coding rows (i.e., CTU/MB row 1 and CTU/MB row 2). It should be noted that, if $N_1 < M_1$ at time $T_2$, the control unit 108 may control the video decoder core VDEC Core 0 to load the required information of CTU/MB row 2 (e.g., status at the beginning of CTU/MB row 2), but does not trigger the video decoder core VDEC Core 0 to start decoding CTU/MB row 2. The decoding of CTU/MB row 2 will be started after the decoding of the $M_1^{th}$ CTU/MB of CTU/MB row 1 is finished by the video decoder core VDEC Core 1.

At time $T_3$, the video decoder core VDEC Core 1 finishes decoding the last CTU/MB of CTU/MB row 1 (i.e., the decoding of CTU/MB row 1 is done now), and generates a notification to the control unit 108. At this moment, the video decoder core VDEC Core 0 finishes decoding $N_2$ CTUs/MBs (i.e., $1^{st}$ CTU/MB to $N_2^{th}$ CTU/MB) of CTU/MB row 2, where $N_2 \geq M_2$. Since decoding of the $M_2^{th}$ CTU/MB of CTU/MB row 2 is already finished and the video decoder core VDEC Core 1 is idle, the control unit 108 controls the video decoder core VDEC Core 1 to load the required information of CTU/MB row 3 (e.g., status at the beginning of CTU/MB row 3), and then triggers the video decoder core VDEC Core 1 to start decoding CTU/MB row 3. In this example shown in FIG. 4, the video decoder core VDEC Core 0 and the video decoder core VDEC Core 1 are both active at time $T_3$, thus achieving the parallel decoding of two coding rows (i.e., CTU/MB row 2 and CTU/MB row 3). It should be noted that, if $N_2 < M_2$ at time $T_3$, the control unit 108 may control the video decoder core VDEC Core 1 to load the required information of CTU/MB row 3 (e.g., status at the beginning of CTU/MB row 3), but does not trigger the video decoder core VDEC Core 1 to start decoding CTU/MB row 3. The decoding of CTU/MB row 3 will be started after the decoding of the $M_2^{th}$ CTU/MB of CTU/MB row 2 is finished by the video decoder core VDEC Core 0.

The above-mentioned procedure will be repeated to accomplish the decoding of following CTU/MB rows. Further description is omitted here for the sake of brevity.

Figure 5:
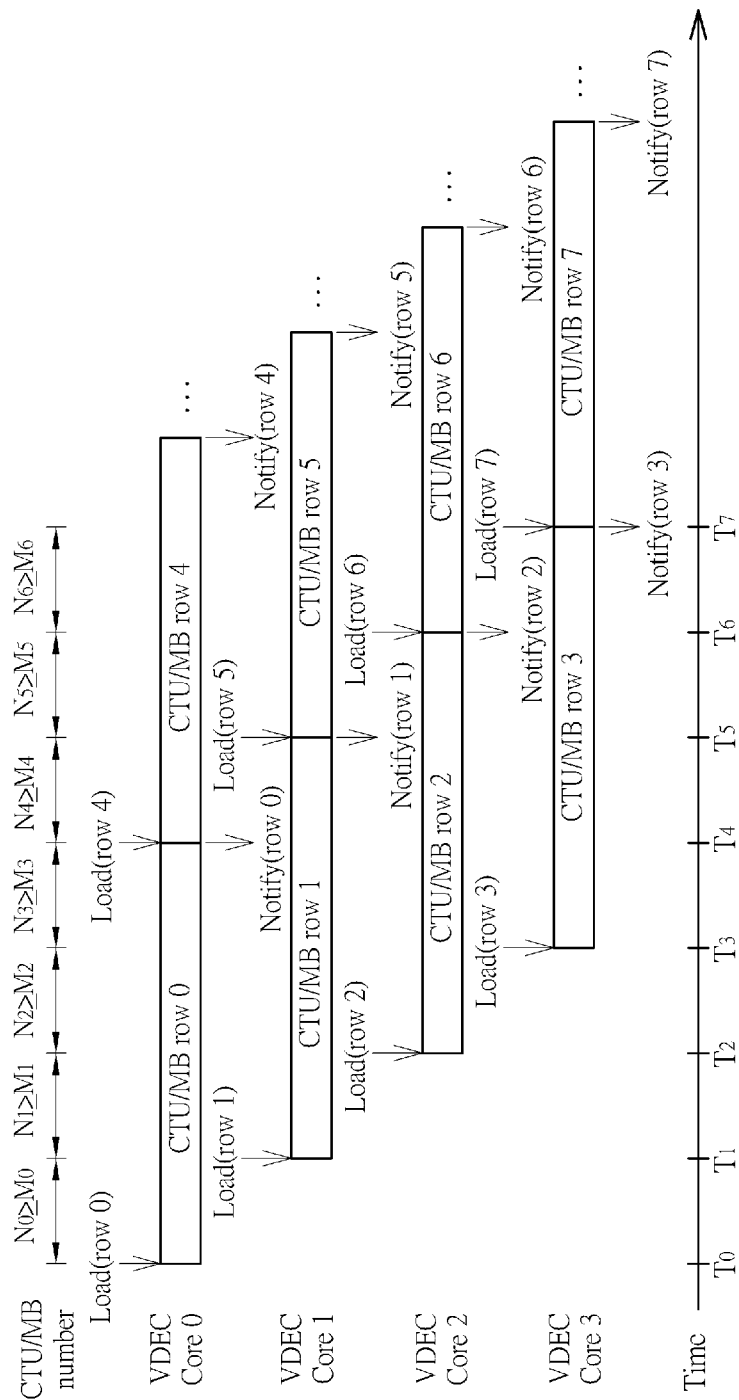
FIG. 5 is a timing diagram illustrating a parallel decoding operation of multiple coding rows according to another embodiment of the present invention.

The CTU/MB row level parallel video decoding process can also be achieved by a multi-core video decoder system with more than two video decoder cores. Please refer to FIG. 5 in conjunction with FIG. 3. FIG. 5 is a timing diagram illustrating a parallel decoding operation of multiple coding rows according to another embodiment of the present invention. For clarity and simplicity, it is assumed that the multi-core video decoder system 100 is a quad-core video decoder system having four video decoder cores VDEC Core 0, VDEC Core 1, VDEC Core 2 and VDEC Core 3. In this example, the video decoder cores 106_1-106_N only have video decoder cores VDEC Core 0-VDEC Core 3 due to N=4. The quad-core video decoder system is used to decode CTU/MB row 0-CTU/MB row I, as shown in FIG. 3. Besides, the M values associated with CTU/MB row 0-CTU/MB row 6 are $M_0$-$M_6$, respectively. Therefore, decoding of CTU/MB row 1 is allowed to be started after decoding of the $M_0^{th}$ CTU/MB of CTU/MB row 0 is finished (i.e., the reconstructed $M_0^{th}$ CTU/MB of CTU/MB row 0 is obtained); decoding of CTU/MB row 2 is allowed to be started after decoding of the $M_1^{th}$ CTU/MB of CTU/MB row 1 is finished (i.e., the reconstructed $M_1^{th}$ CTU/MB of CTU/MB row 1 is obtained); decoding of CTU/MB row 3 is allowed to be started after decoding of the $M_2^{th}$ CTU/MB of CTU/MB row 2 is finished (i.e., the reconstructed $M_2^{th}$ CTU/MB of CTU/MB row 2 is obtained); decoding of CTU/MB row 4 is allowed to be started after decoding of the $M_3^{th}$ CTU/MB of CTU/MB row 3 is finished (i.e., the reconstructed $M_3^{th}$ CTU/MB of CTU/MB row 3 is obtained); decoding of CTU/MB row 5 is allowed to be started after decoding of the $M_4^{th}$ CTU/MB of CTU/MB row 4 is finished (i.e., the reconstructed $M_4^{th}$ CTU/MB of CTU/MB row 4 is obtained); decoding of CTU/MB row 6 is allowed to be started after decoding of the $M_5^{th}$ CTU/MB of CTU/MB row 5 is finished (i.e., the reconstructed $M_5^{th}$ CTU/MB of CTU/MB row 5 is obtained); and decoding of CTU/MB row 7 is allowed to be started after decoding of the $M_6^{th}$ CTU/MB of CTU/MB row 6 is finished (i.e., the reconstructed $M_6^{th}$ CTU/MB of CTU/MB row 6 is obtained).

At time $T_0$, the control unit 108 controls the video decoder core VDEC Core 0 to load the required information of CTU/MB row 0 (e.g., status at the beginning of CTU/MB row 0), and then triggers VDEC Core 0 to start decoding CTU/MB row 0. At time $T_1$, the video decoder core VDEC Core 0 finishes decoding $N_0$ CTUs/MBs (i.e., $1^{st}$ CTU/MB to $N_0^{th}$ CTU/MB) of CTU/MB row 0, where $N_0 \geq M_0$. Hence, the control unit 108 controls the video decoder core VDEC Core 1 to load the required information of CTU/MB row 1 (e.g., status at the beginning of CTU/MB row 1), and then triggers the video decoder core VDEC Core 1 to start decoding CTU/MB row 1. At time $T_2$, the video decoder core VDEC Core 1 finishes decoding $N_1$ CTUs/MBs (i.e., $1^{st}$ CTU/MB to $N_1^{th}$ CTU/MB) of CTU/MB row 1, where $N_1 \geq M_1$. Hence, the control unit 108 controls the video decoder core VDEC Core 2 to load the required information of CTU/MB row 2 (e.g., status at the beginning of CTU/MB row 2), and then triggers the video decoder core VDEC Core 2 to start decoding CTU/MB row 2. At time $T_3$, the video decoder core VDEC Core 2 finishes decoding $N_2$ CTUs/MBs (i.e., $1^{st}$ CTU/MB to $N_2^{th}$ CTU/MB) of CTU/MB row 2, where $N_2 \geq M_2$. Hence, the control unit 108 controls the video decoder core VDEC Core 3 to load the required information of CTU/MB row 3 (e.g., status at the beginning of CTU/MB row 3), and then triggers the video decoder core VDEC Core 3 to start decoding CTU/MB row 3.

At time $T_4$, the video decoder core VDEC Core 0 finishes decoding the last CTU/MB of CTU/MB row 0 (i.e., the decoding of CTU/MB row 0 is done now), and generates a notification to the control unit 108. At this moment, the video decoder core VDEC Core 0 is idle, and the video decoder core VDEC Core 3 finishes decoding $N_3$ CTUs/MBs (i.e., $1^{st}$ CTU/MB to $N_3^{th}$ CTU/MB) of CTU/MB row 3, where $N_3 \geq M_3$. Hence, the control unit 108 controls the video decoder core VDEC Core 0 to load the required information of CTU/MB row 4 (e.g., status at the beginning of CTU/MB row 4), and then triggers the video decoder core VDEC Core 0 to start decoding CTU/MB row 4.

At time $T_5$, the video decoder core VDEC Core 1 finishes decoding the last CTU/MB of CTU/MB row 1 (i.e., the decoding of CTU/MB row 1 is done now), and generates a notification to the control unit 108. At this moment, the video decoder core VDEC Core 1 is idle, and the video decoder core VDEC Core 0 finishes decoding $N_4$ CTUs/MBs (i.e., $1^{st}$ CTU/MB to $N_4^{th}$ CTU/MB) of CTU/MB row 4, where $N_4 \geq M_4$. Hence, the control unit 108 controls the video decoder core VDEC Core 1 to load the required information of CTU/MB row 5 (e.g., status at the beginning of CTU/MB row 5), and then triggers the video decoder core VDEC Core 1 to start decoding CTU/MB row 5.

At time $T_6$, the video decoder core VDEC Core 2 finishes decoding the last CTU/MB of CTU/MB row 2 (i.e., the decoding of CTU/MB row 2 is done now), and generates a notification to the control unit 108. At this moment, the video decoder core VDEC Core 2 is idle, and the video decoder core VDEC Core 1 finishes decoding $N_5$ CTUs/MBs (i.e., $1^{st}$ CTU/MB to $N_5^{th}$ CTU/MB) of CTU/MB row 5, where $N_5 \geq M_5$. Hence, the control unit 108 controls the video decoder core VDEC Core 2 to load the required information of CTU/MB row 6 (e.g., status at the beginning of CTU/MB row 6), and then triggers the video decoder core VDEC Core 2 to start decoding CTU/MB row 6.

At time $T_7$, the video decoder core VDEC Core 3 finishes decoding the last CTU/MB of CTU/MB row 3 (i.e., the decoding of CTU/MB row 3 is done now), and generates a notification to the control unit 108. At this moment, the video decoder core VDEC Core 3 is idle, and the video decoder core VDEC Core 2 finishes decoding $N_6$ CTUs/MBs (i.e., $1^{st}$ CTU/MB to $N_6^{th}$ CTU/MB) of CTU/MB row 6, where $N_6 \geq M_6$. Hence, the control unit 108 controls the video decoder core VDEC Core 3 to load the required information of CTU/MB row 7 (e.g., status at the beginning of CTU/MB row 7), and then triggers the video decoder core VDEC Core 3 to start decoding CTU/MB row 7.

The above-mentioned procedure will be repeated to accomplish the decoding of following CTU/MB rows. Further description is omitted here for the sake of brevity.

As mentioned above, the syntax parser 102 is responsible for parsing the syntax of the encoded video bitstream BS for extracting required information of each picture (especially, required information of each coding row in a picture). The video decoder cores 106_1-106_N are responsible for decoding multiple coding rows based on at least the required information of the multiple coding rows. Hence, there would be a delay between the syntax parser 102 obtaining the required information of the multiple coding rows and the video decoder cores 106_1-106_N starting the decoding of the multiple coding rows. A pipeline mechanism may be employed to schedule the input of the syntax parser 102 and the input of the video decoder cores 106_1-106_N.

In a first exemplary design, pictures to be decoded are pipelined, such that the same picture is processed by the syntax parser 102 and the video decoder cores 106_1-106_N sequentially. Specifically, the control unit 108 triggers the video decoder cores 106_1-106_N to start decoding multiple coding rows in a specific picture after the syntax parser 102 finishes performing syntax parsing upon an integer number of pictures including the specific picture. In other words, the delay between the syntax parser 102 obtaining the required information of the multiple coding rows and the video decoder cores 106_1-106_N starting the decoding of the multiple coding rows may be one picture or more than one picture.

Figure 6:
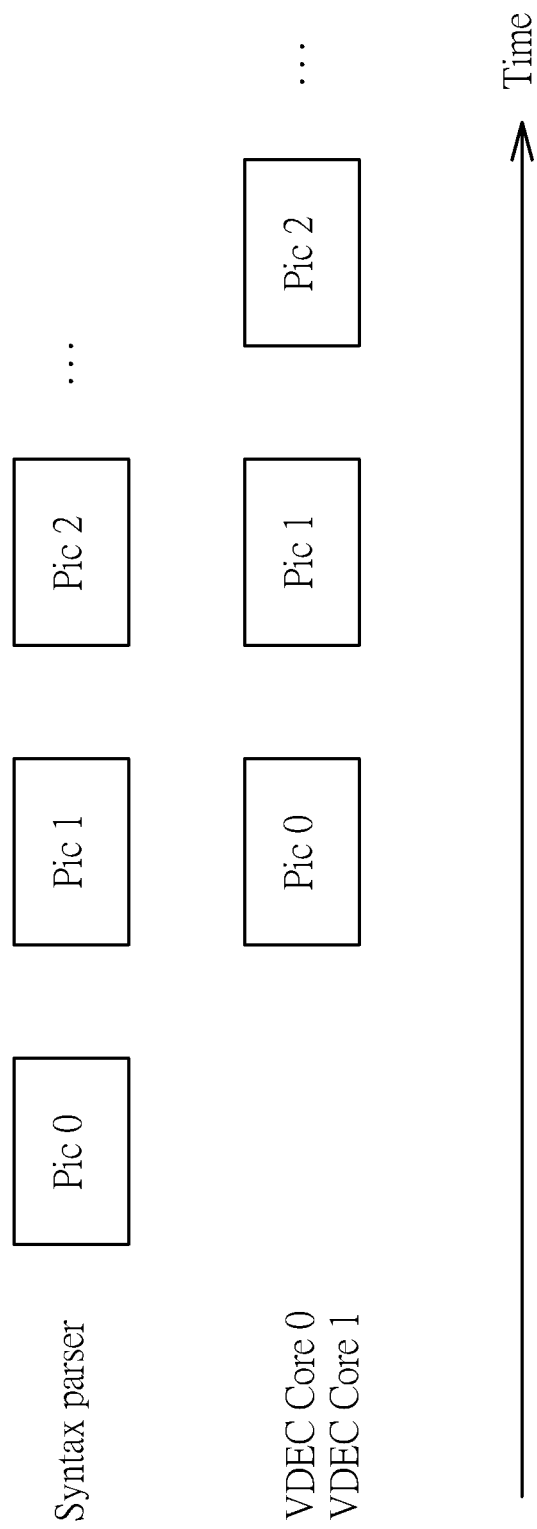
FIG. 6 is a diagram illustrating a picture based pipeline according to an embodiment of the present invention.

Please refer to FIG. 6, which is a diagram illustrating a picture based pipeline according to an embodiment of the present invention. Suppose that the multi-core video decoder system 100 is a dual-core video decoder system having two video decoder cores VDEC Core 0 and VDEC Core 1 only. As shown in FIG. 6, the video decoder cores VDEC Core 0 and VDEC Core 1 are used to decode coding rows (e.g., CTU/MB rows) in a picture Pic 0 after the syntax parser 102 finishes performing syntax parsing upon the picture Pic 0. Similarly, the video decoder cores VDEC Core 0 and VDEC Core 1 are used to decode coding rows (e.g., CTU/MB rows) in a picture Pic 1 after the syntax parser 102 finishes performing syntax parsing upon the picture Pic 1. In this way, the syntax parser 102 performs syntax parsing upon the picture Pic 1 and the video decoder cores VDEC Core 0 and VDEC Core 1 decode coding rows (e.g., CTU/MB rows) in the picture Pic 0, concurrently.

In a second exemplary design, coding rows to be decoded are pipelined, such that the same coding row is processed by the syntax parser 102 and the video decoder cores 106_1-106_N sequentially. Specifically, the control unit 108 triggers the video decoder cores 106_1-106_N to start decoding specific coding rows in a picture after the syntax parser 102 finishes performing syntax parsing upon a portion of the picture that includes at least one of the specific coding rows. In other words, the delay between the syntax parser 102 obtaining the required information of the multiple coding rows and the video decoder cores 106_1-106_N starting the decoding of the multiple coding rows may be one coding row or more than one coding row.

Figure 7:
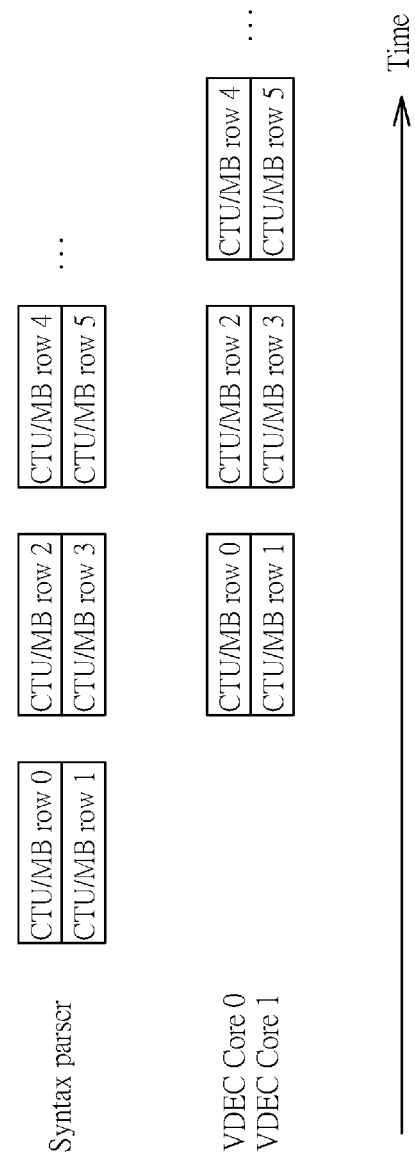
FIG. 7 is a diagram illustrating a coding row based pipeline according to an embodiment of the present invention.

Please refer to FIG. 7, which is a diagram illustrating a coding row based pipeline according to an embodiment of the present invention. Suppose that the multi-core video decoder system 100 is a dual-core video decoder system having two video decoder cores VDEC Core 0 and VDEC Core 1 only. As shown in FIG. 7, the video decoder cores VDEC Core 0 and VDEC Core 1 are used to decode coding rows CTU/MB row 0 and CTU/MB row 1 in a current picture (e.g., the picture IMG shown in FIG. 3) after the syntax parser 102 finishes performing syntax parsing upon coding rows CTU/MB row 0 and CTU/MB row 1 in the current picture. Similarly, the video decoder cores VDEC Core 0 and VDEC Core 1 are used to decode coding rows CTU/MB row 2 and CTU/MB row 3 in the current picture (e.g., the picture IMG shown in FIG. 3) after the syntax parser 102 finishes performing syntax parsing upon CTU/MB row 2 and CTU/MB row 3. In this way, the syntax parser 102 performs syntax parsing upon CTU/MB row 2 and CTU/MB row 3 and the video decoder cores VDEC Core 0 and VDEC Core 1 decode CTU/MB row 0 and CTU/MB row 1, concurrently.

In addition to the required information INF for each picture, the syntax parser 102 may further perform error detection, generate an error table $TB_{Err}$ of a picture based on at least an error detection result, and store the error table $TB_{Err}$ into the memory 114 of the storage device 104. Please refer to FIG. 8, which is a diagram illustrating an error table $TB_{Err}$ generated from the syntax parser 102 and referenced by the video decoder cores 106_1-106_N. While parsing the syntax of one picture, the syntax parser 102 further detects whether the picture includes erroneous encoded data units (e.g., erroneous CTUs/MBs) having uncorrectable errors included therein. In one exemplary design, the syntax parser 102 may only treat detected erroneous encoded data units (e.g., CTUs/MBs actually found as erroneous CTUs/MBs by error detection) as erroneous encoded data units that should be recorded in the error table $TB_{Err}$. Alternatively, besides the detected erroneous encoded data units (e.g., CTUs/MBs actually found as erroneous CTUs/MBs by error detection), the syntax parser 102 may further treat one or more encoded data units (e.g., CTUs/MBs not found as erroneous CTUs/MBs by error detection) preceding the detected erroneous encoded data units as erroneous encoded data units that should be recorded in the error table $TB_{Err}$. However, this is for illustrative purposes only, and is not meant to be a limitation of the present invention.

Figure 8:
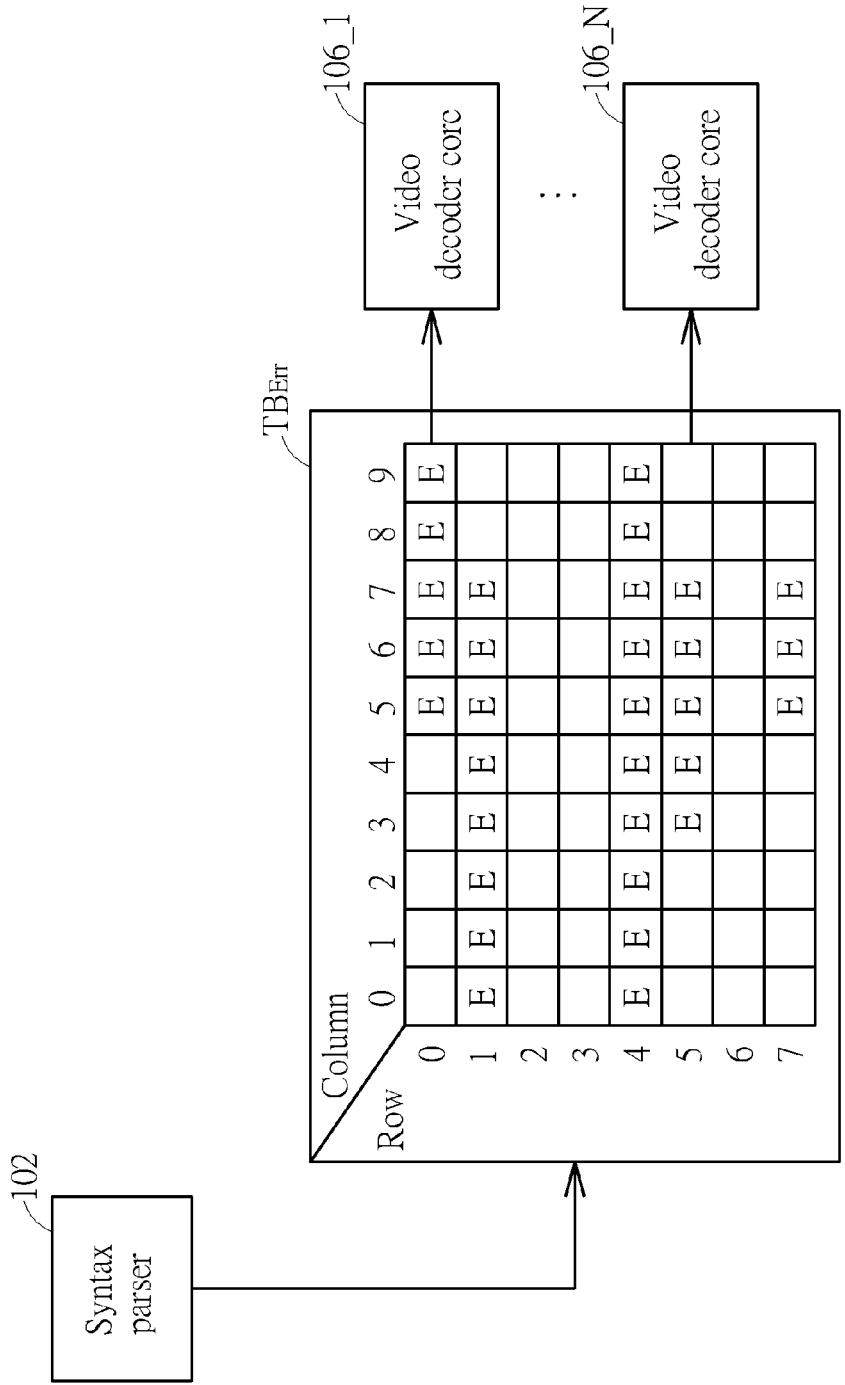
FIG. 8 is a diagram illustrating an error table generated from the syntax parser and referenced by the video decoder cores.

As shown in FIG. 8, the error table $TB_{Err}$ set by the syntax parser 102 records error information E indicative of each erroneous encoded data unit in the picture. The video decoder cores 106_1-106_N are further arranged to perform error handling according to the error information E obtained from the error table $TB_{Err}$. Taking the coding row 0 for example, the error table $TB_{Err}$ indicates that the $1^{st}$ encoded data unit to $5^{th}$ encoded data unit are error-free, and indicates that the $6^{th}$ encoded data unit to $10^{th}$ encoded data unit have uncorrectable errors included therein. Therefore, when the video decoder core 106_1 is used to decode the coding row 0, a normal decoding operation is applied to the $1^{st}$ encoded data unit to $5^{th}$ encoded data unit, and no decoding operation is applied to $6^{th}$ encoded data unit to $10^{th}$ encoded data unit. Besides, error concealment may be enabled by the video decoder core 106_1 to decide decoding results of the $6^{th}$ encoded data unit to $10^{th}$ encoded data unit.

As mentioned above, one picture (e.g., one UHD picture) may be partitioned into a plurality of tiles, each having a plurality of coding rows (e.g., MB rows or CTU rows). In above examples, the video decoder cores 106_1-106_N sequentially decode coding rows in the same tile (e.g., CTU/MB row 0-CTU/MB row I of tile 0, as shown in FIG. 3). However, this is for illustrative purposes only, and is not meant to be a limitation of the present invention. For example, in an alternative design, a different processing order may be followed by the video decoder cores 106_1-106_N. Several exemplary processing orders for the video decoder cores 106_1-106_N are given as below.

Figure 9:
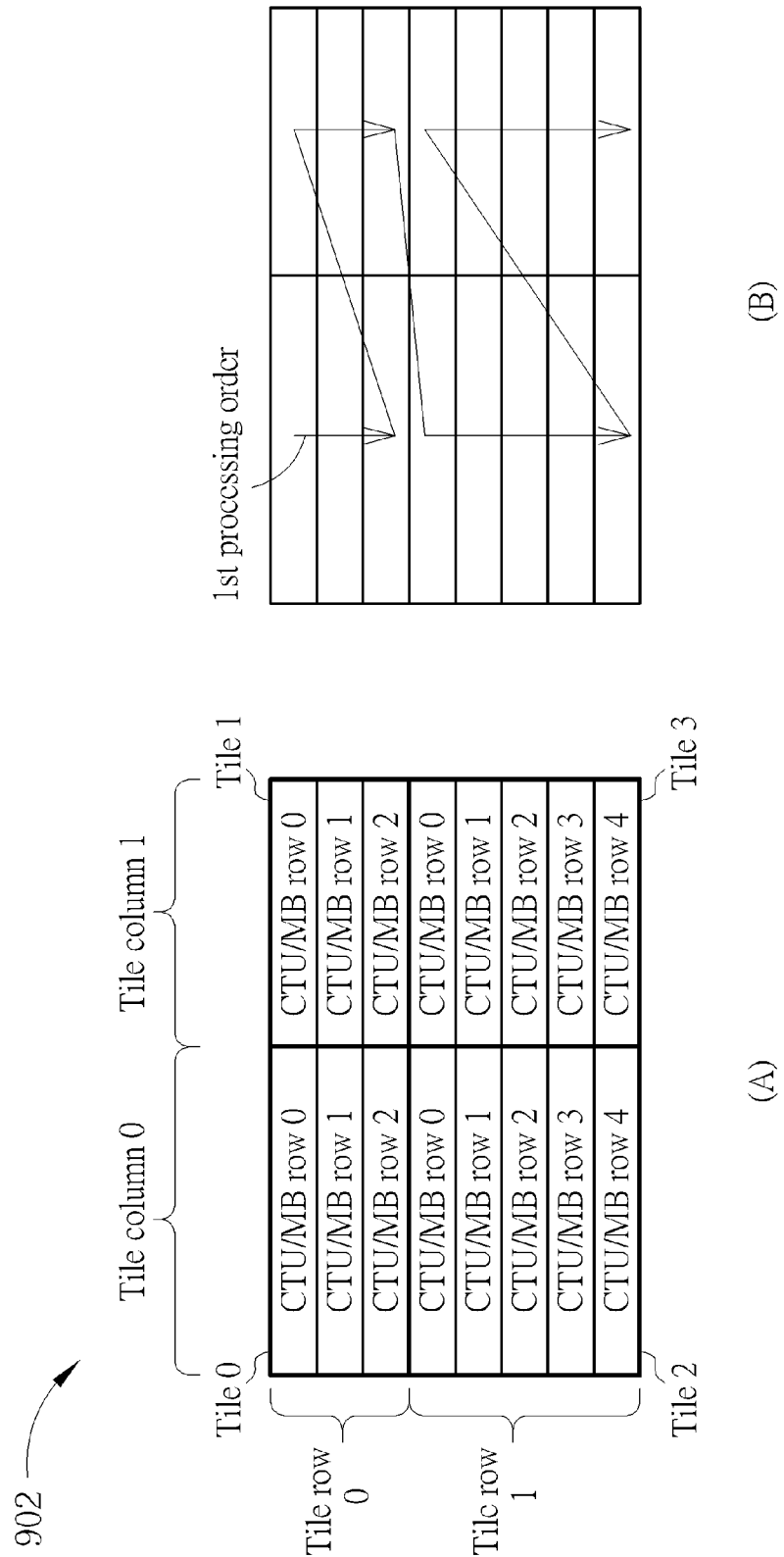
FIG. 9 is a diagram illustrating a first processing order followed by the video decoder cores according to an embodiment of the present invention.

Please refer to FIG. 9, which is a diagram illustrating a first processing order followed by the video decoder cores 106_1-106_N according to an embodiment of the present invention. As illustrated in sub-diagram (A) of FIG. 9, one picture 902 with an exemplary tile partition layout has four tiles, including tile 0, tile 1, tile 2 and tile 3. Specifically, the exemplary tile partition layout defines two tile columns (which include tile column 0 and tile column 1) and two tile rows (which include tile row 0 and tile row 1), where the row height for tile row 0 is equal to 3, and the row height for tile row 1 is equal to 5. As illustrated in sub-diagram (B) of FIG. 9, the first processing order defines that coding rows in each tile are decoded in a vertical scan order, and tiles in the picture 902 are decoded in a raster scan order.

In a case where the multi-core video decoder system 100 is a dual-core video decoder system having only two video decoder cores VDEC Core 0 and VDEC Core 1, the first video decoder core VDEC Core 0 is responsible for sequentially decoding (CTU/MB row 0, tile 0), (CTU/MB row 2, tile 0), (CTU/MB row 1, tile 1), (CTU/MB row 0, tile 2), (CTU/MB row 2, tile 2), (CTU/MB row 4, tile 2), (CTU/MB row 1, tile 3), and (CTU/MB row 3, tile 3); and the second video decoder core VDEC Core 1 is responsible for sequentially decoding (CTU/MB row 1, tile 0), (CTU/MB row 0, tile 1), (CTU/MB row 2, tile 1), (CTU/MB row 1, tile 2), (CTU/MB row 3, tile 2), (CTU/MB row 0, tile 3), (CTU/MB row 2, tile 3), and (CTU/MB row 4, tile 3).

In another case where the multi-core video decoder system 100 is a quad-core video decoder system having only four video decoder cores VDEC Core 0, VDEC Core 1, VDEC Core 2 and VDEC Core 3, the first video decoder core VDEC Core 0 is responsible for sequentially decoding (CTU/MB row 0, tile 0), (CTU/MB row 1, tile 1), (CTU/MB row 2, tile 2), and (CTU/MB row 1, tile 3); the second video decoder core VDEC Core 1 is responsible for sequentially decoding (CTU/MB row 1, tile 0), (CTU/MB row 2, tile 1), (CTU/MB row 3, tile 2), and (CTU/MB row 2, tile 3); the third video decoder core VDEC Core 2 is responsible for sequentially decoding (CTU/MB row 2, tile 0), (CTU/MB row 0, tile 2), (CTU/MB row 4, tile 2), and (CTU/MB row 3, tile 3); and the fourth video decoder core VDEC Core 3 is responsible for sequentially decoding (CTU/MB row 0, tile 1), (CTU/MB row 1, tile 2), (CTU/MB row 0, tile 3), and (CTU/MB row 4, tile 3).

Figure 10:
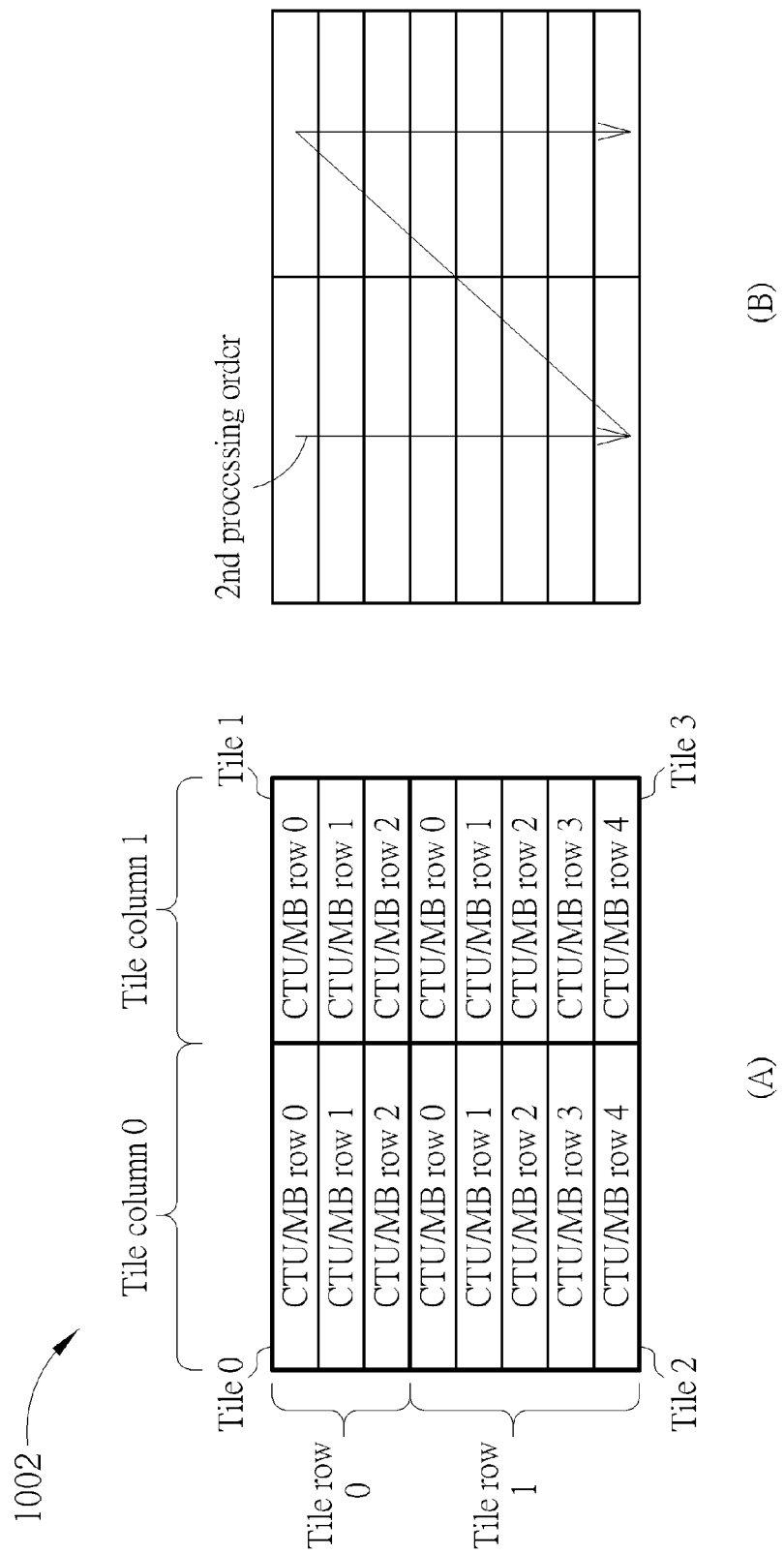
FIG. 10 is a diagram illustrating a second processing order followed by the video decoder cores according to an embodiment of the present invention.

Please refer to FIG. 10, which is a diagram illustrating a second processing order followed by the video decoder cores 106_1-106_N according to an embodiment of the present invention. As illustrated in sub-diagram (A) of FIG. 10, one picture 1002 with an exemplary tile partition layout has four tiles, including tile 0, tile 1, tile 2 and tile 3. Specifically, the exemplary tile partition layout defines two tile columns (which include tile column 0 and tile column 1) and two tile rows (which include tile row 0 and tile row 1), where the row height for tile row 0 is equal to 3, and the row height for tile row 1 is equal to 5. As illustrated in sub-diagram (B) of FIG. 10, the second processing order defines that coding rows in each tile column are decoded in a vertical scan order, and tile columns in the picture 1002 are decoded in a horizontal scan order.

In a case where the multi-core video decoder system 100 is a dual-core video decoder system having only two video decoder cores VDEC Core 0 and VDEC Core 1, the first video decoder core VDEC Core 0 is responsible for sequentially decoding (CTU/MB row 0, tile 0), (CTU/MB row 2, tile 0), (CTU/MB row 1, tile 2), (CTU/MB row 3, tile 2), (CTU/MB row 0, tile 1), (CTU/MB row 2, tile 1), (CTU/MB row 1, tile 3), and (CTU/MB row 3, tile 3); and the second video decoder core VDEC Core 1 is responsible for sequentially decoding (CTU/MB row 1, tile 0), (CTU/MB row 0, tile 2), (CTU/MB row 2, tile 2), (CTU/MB row 4, tile 2), (CTU/MB row 1, tile 1), (CTU/MB row 0, tile 3), (CTU/MB row 2, tile 3), and (CTU/MB row 4, tile 3).

In another case where the multi-core video decoder system 100 is a quad-core video decoder system having only four video decoder cores VDEC Core 0, VDEC Core 1, VDEC Core 2 and VDEC Core 3, the first video decoder core VDEC Core 0 is responsible for sequentially decoding (CTU/MB row 0, tile 0), (CTU/MB row 1, tile 2), (CTU/MB row 0, tile 1), and (CTU/MB row 1, tile 3); the second video decoder core VDEC Core 1 is responsible for sequentially decoding (CTU/MB row 1, tile 0), (CTU/MB row 2, tile 2), (CTU/MB row 1, tile 1), and (CTU/MB row 2, tile 3); the third video decoder core VDEC Core 2 is responsible for sequentially decoding (CTU/MB row 2, tile 0), (CTU/MB row 3, tile 2), (CTU/MB row 2, tile 1), and (CTU/MB row 3, tile 3); and the fourth video decoder core VDEC Core 3 is responsible for sequentially decoding (CTU/MB row 0, tile 2), (CTU/MB row 4, tile 2), (CTU/MB row 0, tile 3), and (CTU/MB row 4, tile 3).

Figure 11:
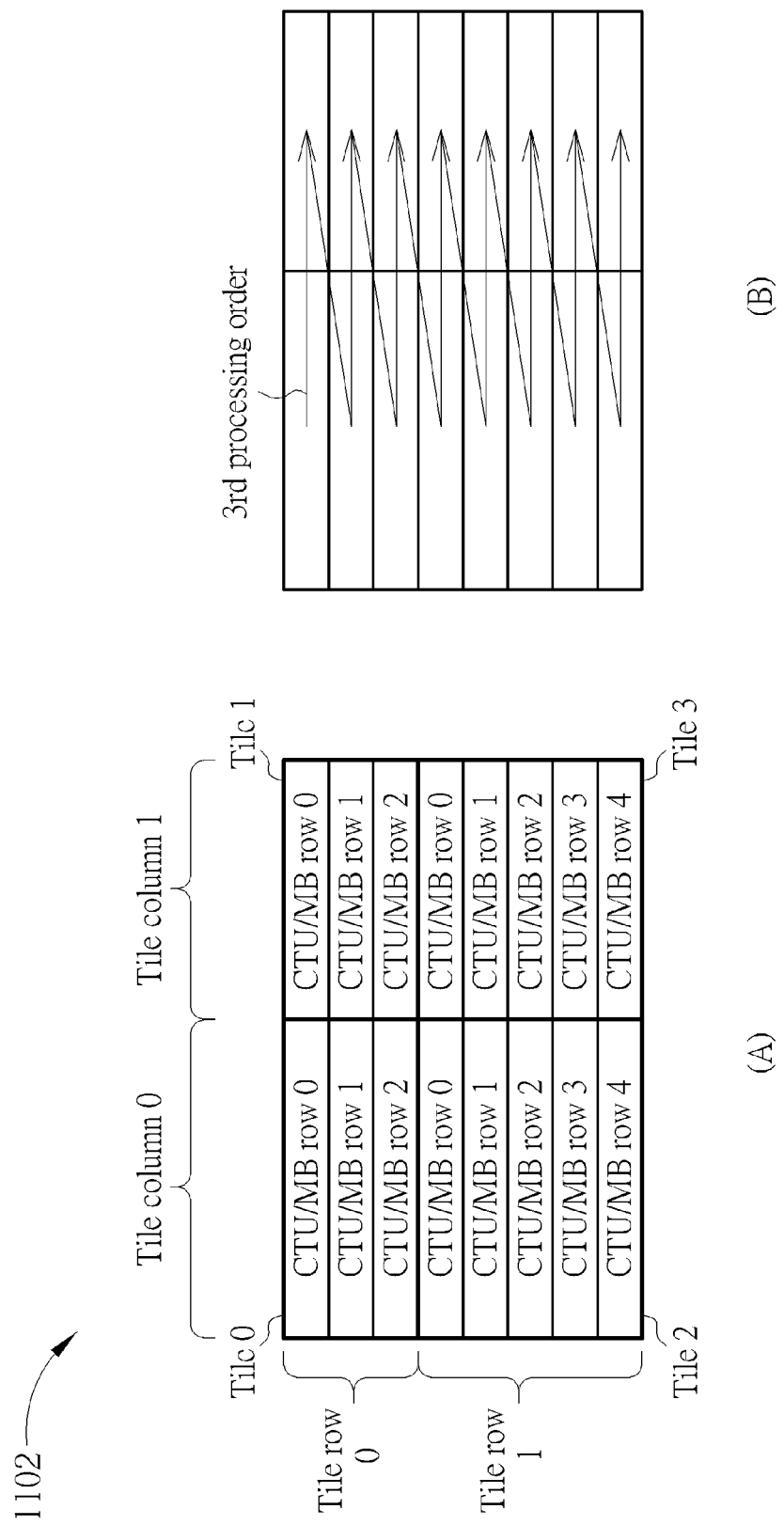
FIG. 11 is a diagram illustrating a third processing order followed by the video decoder cores according to an embodiment of the present invention.

Please refer to FIG. 11, which is a diagram illustrating a third processing order followed by the video decoder cores 106_1-106_N according to an embodiment of the present invention. As illustrated in sub-diagram (A) of FIG. 11, one picture 1102 with an exemplary tile partition layout has four tiles, including tile 0, tile 1, tile 2 and tile 3. Specifically, the exemplary tile partition layout defines two tile columns (which include tile column 0 and tile column 1) and two tile rows (which include tile row 0 and tile row 1), where the row height for tile row 0 is equal to 3, and the row height for tile row 1 is equal to 5. As illustrated in sub-diagram (B) of FIG. 11, the third processing order defines that all coding rows in the same picture 1102 are decoded in a raster scan order.

In a case where the multi-core video decoder system 100 is a dual-core video decoder system having only two video decoder cores VDEC Core 0 and VDEC Core 1, the first video decoder core VDEC Core 0 is responsible for sequentially decoding (CTU/MB row 0, tile 0), (CTU/MB row 1, tile 0), (CTU/MB row 2, tile 0), (CTU/MB row 0, tile 2), (CTU/MB row 1, tile 2), (CTU/MB row 2, tile 2), (CTU/MB row 3, tile 2), and (CTU/MB row 4, tile 2); and the second video decoder core VDEC Core 1 is responsible for sequentially decoding (CTU/MB row 0, tile 1), (CTU/MB row 1, tile 1), (CTU/MB row 2, tile 1), (CTU/MB row 0, tile 3), (CTU/MB row 1, tile 3), (CTU/MB row 2, tile 3), (CTU/MB row 3, tile 3), and (CTU/MB row 4, tile 3).

In another case where the multi-core video decoder system 100 is a quad-core video decoder system having only four video decoder cores VDEC Core 0, VDEC Core 1, VDEC Core 2 and VDEC Core 3, the first video decoder core VDEC Core 0 is responsible for sequentially decoding (CTU/MB row 0, tile 0), (CTU/MB row 2, tile 0), (CTU/MB row 1, tile 2), and (CTU/MB row 3, tile 2); the second video decoder core VDEC Core 1 is responsible for sequentially decoding (CTU/MB row 0, tile 1), (CTU/MB row 2, tile 1), (CTU/MB row 1, tile 3), and (CTU/MB row 3, tile 3); the third video decoder core VDEC Core 2 is responsible for sequentially decoding (CTU/MB row 1, tile 0), (CTU/MB row 0, tile 2), (CTU/MB row 2, tile 2), and (CTU/MB row 4, tile 2); and the fourth video decoder core VDEC Core 3 is responsible for sequentially decoding (CTU/MB row 1, tile 1), (CTU/MB row 0, tile 3), (CTU/MB row 2, tile 3), and (CTU/MB row 4, tile 3).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A multi-core video decoder system, comprising:
    a syntax parser, arranged to perform syntax parsing upon an incoming encoded video bitstream to derive required information of each picture to be decoded;
    a storage device, arranged to buffer the required information of each picture; and
    a plurality of video decoder cores, each having a decoder arranged to perform syntax parsing, wherein the syntax parser and the decoder are separate circuits;
    wherein the video decoder cores load required information of a plurality of coding rows in a picture from the storage device and then decode the coding rows in the picture, respectively;
    wherein the coding rows comprise a first coding row and a second coding row that are vertically adjacent to each other in the picture; decoding of the second coding row requires information given from a decoding result of the first coding row; and
    before decoding of the first coding row is completed by a first video decoder core of the video decoder cores, a second video decoder core of the video decoder cores starts decoding the second coding row according to required information of the second coding row that is generated by the syntax parser;
    wherein before the decoder of one of the video decoder cores performs syntax parsing upon the first coding row, the syntax parser performs syntax parsing upon the first coding row to obtain pre-parsed syntax information as the required information of the second coding row;
    wherein the syntax parser is not a part of the decoder in each of the video decoder cores, and the syntax parser and the decoder in said each of the video decoder cores are all equipped with syntax parsing capability.

2. The multi-core video decoder system of claim 1, wherein each coding row comprises at least one macroblock (MB) row or at least one coding tree unit (CTU) row.

3. The multi-core video decoder system of claim 1, wherein regarding each coding row, the syntax parser only stores a status at a designated start point of a decoding operation of the coding row that one of the video decoder cores uses to start decoding the coding row into the storage device to serve as required information of the coding row.

4. The multi-core video decoder system of claim 3, wherein the designated start point is at a beginning of the coding row.

5. The multi-core video decoder system of claim 1, wherein a processing time of at least one of the video decoder cores decoding at least one of the coding rows is overlapped with a processing time of at least another one of the video decoder cores decoding at least another one of the coding rows.

6. The multi-core video decoder system of claim 1, wherein the second video decoder core of the video decoder cores does not start decoding the second coding row below the first coding row until the first video decoder core of the video decoder cores finishes decoding an $M^{th}$ encoded data unit in the first coding row; and M is a positive integer.

7. The multi-core video decoder system of claim 1, wherein pictures to be decoded are processed by the syntax parser and the video decoder cores through a picture based pipeline; and the video decoder cores start decoding the coding rows in the picture after the syntax parser finishes performing syntax parsing upon an integer number of pictures including the picture.

8. The multi-core video decoder system of claim 1, wherein coding rows to be decoded are processed by the syntax parser and the video decoder cores through a coding row based pipeline; and the video decoder cores start decoding the coding rows in the picture after the syntax parser finishes performing syntax parsing upon a portion of the picture that includes at least one of the coding rows.

9. The multi-core video decoder system of claim 1, wherein the syntax parser is further arranged to perform error detection, generate an error table of the picture based on at least an error detection result, and store the error table into the storage device; the error table records error information indicative of each erroneous encoded data unit in the picture; and the video decoder cores are further arranged to perform error handling according to the error information obtained from the error table.

10. The multi-core video decoder system of claim 1, wherein the picture is partitioned into a plurality of tiles each composed of coding rows, the coding rows in each tile are decoded by the video decoder cores in a vertical scan order, and the tiles in the picture are decoded by the video decoder cores in a raster scan order.

11. The multi-core video decoder system of claim 1, wherein the picture is partitioned into a plurality of tiles each composed of coding rows, the coding rows in each tile column are decoded by the video decoder cores in a vertical scan order, and the tile columns in the picture are decoded by the video decoder cores in a horizontal scan order.

12. The multi-core video decoder system of claim 1, wherein the picture is partitioned into a plurality of tiles each composed of coding rows, and all coding rows in the picture are decoded by the video decoder cores in a raster scan order.

13. A multi-core video decoding method, comprising:
    performing syntax parsing upon an incoming encoded video bitstream to derive required information of each picture to be decoded;
    storing the required information of each picture into a storage device; and
    utilizing a plurality of video decoder cores to load required information of a plurality of coding rows in a picture from the storage device and then decode the coding rows in the picture, respectively, wherein each of the video decoder cores has a decoder arranged to perform syntax parsing, and the step of performing syntax parsing upon the incoming encoded video bitstream to derive required information of each picture to be decoded is not executed by the decoder in said each of the video decoder cores;
    wherein the coding rows comprise a first coding row and a second coding row that are vertically adjacent to each other in the picture; decoding of the second coding row requires information given from a decoding result of the first coding row; and before decoding of the first coding row is completed by a first video decoder core of the video decoder cores, a second video decoder core of the video decoder cores starts decoding the second coding row according to required information of the second coding row that is generated by the syntax parsing;

wherein before the decoder of one of the video decoder cores performs syntax parsing upon the first coding row, the step of performing syntax parsing upon the incoming encoded video bitstream to derive required information of each picture to be decoded performs syntax parsing upon the first coding row to obtain pre-parsed syntax information as the required information of the second coding row.

14. The multi-core video decoding method of claim 13, wherein each coding row comprises at least one macroblock (MB) row or at least one coding tree unit (CTU) row.

15. The multi-core video decoding method of claim 13, wherein the step of storing the required information of each picture into the storage device comprises:
regarding each coding row, only storing a status at a designated start point of a decoding operation of the coding row that one of the video decoder cores uses to start decoding the coding row into the storage device to serve as required information of the coding row.

16. The multi-core video decoding method of claim 15, wherein the designated start point is at a beginning of the coding row.

17. The multi-core video decoding method of claim 13, wherein a processing time of at least one of the video decoder cores decoding at least one of the coding rows is overlapped with a processing time of at least another one of the video decoder cores decoding at least another one of the coding rows.

18. The multi-core video decoding method of claim 13, wherein the second video decoder core of the video decoder cores is not triggered to start decoding the second coding row below the first coding row until the first video decoder core of the video decoder cores finishes decoding an $M^{th}$ encoded data unit in the first coding row; and M is a positive integer.

19. The multi-core video decoding method of claim 13, wherein pictures to be decoded are processed by the syntax parsing and the video decoder cores through a picture based pipeline; and the video decoder cores are trigged to start decoding the coding rows in the picture after the syntax parsing performed upon an integer number of pictures including the picture is finished.

20. The multi-core video decoding method of claim 13, wherein coding rows to be decoded are processed by the syntax parsing and the video decoder cores through a coding row based pipeline; and the video decoder cores are triggered to start decoding the coding rows in the picture after the syntax parsing performed upon a portion of the picture that includes at least one of the coding rows is finished.

21. The multi-core video decoding method of claim 13, wherein the step of performing the syntax parsing further comprises:
performing error detection;
generating an error table of the picture based on at least an error detection result; and
storing the error table into the storage device, wherein the error table records error information indicative of each erroneous encoded data unit in the picture; and
the multi-core video decoding method further comprises:
utilizing the video decoder cores to perform error handling according to the error information obtained from the error table.

22. The multi-core video decoding method of claim 13, wherein the picture is partitioned into a plurality of tiles each composed of coding rows, the coding rows in each tile are decoded by the video decoder cores in a vertical scan order, and the tiles in the picture are decoded by the video decoder cores in a raster scan order.

23. The multi-core video decoding method of claim 13, wherein the picture is partitioned into a plurality of tiles each composed of coding rows, the coding rows in each tile column are decoded by the video decoder cores in a vertical scan order, and the tile columns in the picture are decoded by the video decoder cores in a horizontal scan order.

24. The multi-core video decoding method of claim 13, wherein the picture is partitioned into a plurality of tiles each composed of coding rows, and all coding rows in the picture are decoded by the video decoder cores in a raster scan order.

25. The multi-core video decoder system of claim 1, wherein the syntax parser performs syntax parsing upon all coding rows in the picture, and the video decoder in said each of the video decoder cores performs syntax parsing upon only a portion of said all coding rows in the picture.

26. The multi-core video decoding method of claim 13, wherein the step of performing syntax parsing upon the incoming encoded video bitstream to derive required information of each picture to be decoded performs syntax parsing upon all coding rows in the picture; and the video decoder in said each of the video decoder cores performs syntax parsing upon only a portion of said all coding rows in the picture.

* * * * *